United States Patent [19]

Syktich et al.

[11] Patent Number: 5,618,878
[45] Date of Patent: Apr. 8, 1997

[54] HYDROGEN SILSESQUIOXANE RESIN COATING COMPOSITION

[75] Inventors: Cecelia M. Syktich, Saginaw; Gary A. Vincent, Midland; Kristen A. Scheibert, Sanford, all of Mich.

[73] Assignee: Dow Corning Corporation, Midland, Mich.

[21] Appl. No.: 418,725

[22] Filed: Apr. 7, 1995

[51] Int. Cl.⁶ ................................................. C08K 5/01
[52] U.S. Cl. ............................. 524/588; 528/15; 528/31; 524/858; 106/287.1; 501/154
[58] Field of Search ...................... 528/31, 15; 524/588, 524/858; 106/287.1; 501/154

[56] References Cited

U.S. PATENT DOCUMENTS

| | | | |
|---|---|---|---|
| 4,756,977 | 7/1988 | Haluska et al. | 428/704 |
| 5,320,868 | 6/1994 | Ballance et al. | 427/228 |
| 5,370,904 | 12/1994 | Mine et al. | 427/126.2 |

Primary Examiner—Margaret W. Glass
Attorney, Agent, or Firm—Roger E. Gobrogge; Sharon K. Severance

[57] ABSTRACT

Disclosed are coating compositions which include hydrogen silsesquioxane resin dissolved in saturated alkyl hydrocarbons. The compositions are useful for forming coatings which are thick and/or have good coating quality.

10 Claims, 1 Drawing Sheet

HYDROGEN SILSESQUIOXANE RESIN COATING COMPOSITION

BACKGROUND OF THE INVENTION

The present invention relates to a coating composition containing hydrogen silsesquioxane resin. The composition comprises hydrogen silsesquioxane resin diluted in saturated alkyl hydrocarbons and mixtures thereof.

Hydrogen silsesquioxane resin and its use in forming coatings on electronic devices is known in the art. For instance, U.S. Pat. No. 4,756,977 teaches a process of forming a coating on an electronic device comprising diluting hydrogen silsesquioxane resin in a solvent, applying the solution to the electronic device and heating the coated device to convert the resin to a ceramic. The reference, however, only lists toluene and n-heptane as exemplary solvents.

Similarly, patents such as U.S. Pat. No. 5,320,868 teach additional solvents which can be used for coating hydrogen silsesquioxane resin. These include alcohols such as ethyl or isopropyl, aromatic hydrocarbons such as benzene or toluene, alkanes such as n-heptane or dodecane, ketones, cyclic dimethylpolysiloxanes, esters or glycol ethers. Again, this reference does not mention the solvents specifically claimed herein.

The present inventors have now discovered that specific hydrocarbons and blends thereof are stable and can be used to form desirable coatings on electronic devices.

SUMMARY OF THE INVENTION

The present invention relates to a coating composition. This composition contains between about 10 and about 40 weight percent hydrogen silsesquioxane resin diluted in a solvent. The solvent comprises up to about 25 weight percent decane, between about 10 and about 40 weight percent iso-octane and between about 60 and about 90 weight percent octane.

This invention also relates to a coating composition containing between about 10 and about 40 weight percent hydrogen silsesquioxane resin diluted in a solvent. The solvent comprises between about 60 and about 80 weight percent iso-octane, up to about 40 weight percent octane and up to about 40 weight percent decane.

DETAILED DESCRIPTION OF THE INVENTION

Figure 1:
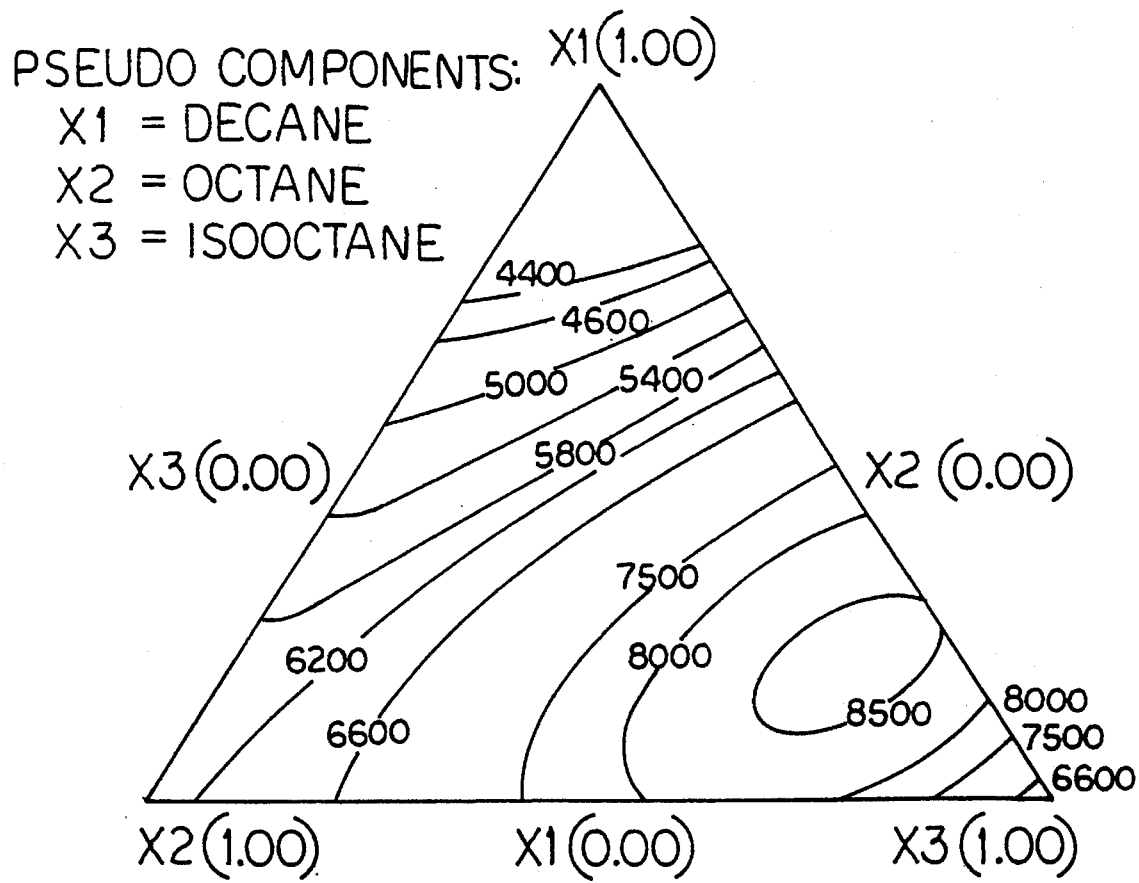
FIG. 1 is a plot representing the predicted coating thickness for coating compositions with varying amounts of decane, iso-octane and octane solvents.

The present invention is based on the unexpected discovery that the solvent used to deposit a coating of hydrogen silsesquioxane resin (H-resin) can have a dramatic effect on the resultant coating. For instance, the solvent can affect the stability of an H-resin solution, it can affect the quality of the resultant coating and it can affect the thickness of the resultant coating.

Accordingly, the present inventors undertook an extensive review of solvents and discovered that saturated alkyl hydrocarbons and blends thereof can be used to form stable solutions of H-resin. These stable solutions, in turn, can be used to deposit coatings which have excellent quality and unexpected thickness.

Because of these advantages, the coating compositions of the present invention are particularly valuable on electronic substrates. Such coatings could serve, for example, as protective coatings, interlevel dielectric layers, doped dielectric layers to produce transistor like devices, pigment loaded binder systems containing silicon to produce capacitor and capacitor like devices, multilayer devices, 3-D devices, silicon on insulator devices, coatings for superconductors, super lattice devices and the like.

As used in the present invention, the expression "ceramic" is used to describe the hard, Si-O containing coatings obtained after heating hydrogen silsesquioxane resin. These coatings may contain both silica ($SiO_2$) materials as well as silica-like materials (eg., SiO, $Si_2O_3$, etc.) which are not fully free of residual carbon, silanol (Si-OH) and/or hydrogen. The expression "electronic substrate" is meant to include, but is not limited to, electronic devices or electronic circuits such as silicon based devices, gallium arsenide based devices, focal plane arrays, opto-electronic devices, photovoltaic cells and optical devices.

The compositions of the present invention contain between about 10 and about 40 weight percent H-resin and preferably between about 15 and about 30 weight percent H-resin dissolved in a solvent. The H-resin which may be used in this invention includes hydridosiloxane resins of the formula $HSi(OH)_x(OR)_yO_{z/2}$, in which each R is independently an organic group or a substituted organic group which, when bonded to silicon through the oxygen atom, forms a hydrolyzable substituent, x=0-2, y=0-2, z=1-3, x+y+z=3. Examples of R include alkyls such as methyl, ethyl, propyl, butyl, etc., aryls such as phenyl, and alkenyls such as allyl or vinyl. These resins may be fully condensed $(HSiO_{3/2})_n$ or they may be only partially hydrolyzed (i.e., containing some Si-OR) and/or partially condensed (i.e., containing some Si-OH). Although not represented by this structure, these resins may also contain a small number (eg., less than about 10%) of silicon atoms which have either 0 or 2 hydrogen atoms attached thereto or a small number of SiC bonds due to various factors involved in their formation or handling.

The above H-resins and methods for their production are known in the art. For example, Collins et al. in U.S. Pat. No. 3,615,272, which is incorporated herein by reference, teach the production of a nearly fully condensed H-resin (which may contain up to 100-300 ppm silanol) by a process comprising hydrolyzing trichlorosilane in a benzenesulfonic acid hydrate hydrolysis medium and then washing the resultant resin with water or aqueous sulfuric acid. Similarly, Bank et al. in U.S. Pat. No. 5,010,159, which is hereby incorporated by reference, teach an alternative method comprising hydrolyzing hydridosilanes in an arylsulfonic acid hydrate hydrolysis medium to form a resin which is then contacted with a neutralizing agent.

Other hydridosiloxane resins, such as those described by Frye et al. in U.S. Pat. No. 4,999,397, hereby incorporated by reference, those produced by hydrolyzing an alkoxy or acyloxy silane in an acidic, alcoholic hydrolysis medium, those described in Kokai Patent Nos. 59-178749, 60-86017 and 63-107122, or any other equivalent hydridosiloxane, will also function herein.

It is to be noted that in a preferred embodiment of the invention, specific molecular weight fractions of the above H-resins may also be used in this process. Such fractions and methods for their preparation are taught by Hanneman et al.

in U.S. Pat. No. 5,063,267 which is hereby incorporated by reference. A preferred fraction comprises material wherein at least 75% of the polymeric species have a molecular weight above about 1200 and a more preferred fraction comprises material wherein at least 75% of the polymeric species have a molecular weight between about 1200 and about 100,000.

The hydrogen silsesquioxane resin coating material may also contain other ceramic oxide precursors. Examples of such ceramic oxide precursors include compounds of various metals such as aluminum, titanium, zirconium, tantalum, niobium and/or vanadium as well as various non-metallic compounds such as those of boron or phosphorous which may be dissolved in solution, hydrolyzed, and subsequently pyrolyzed, at relatively low temperatures and relatively rapid reaction rates to form ceramic oxide coatings.

The above ceramic oxide precursor compounds generally have one or more hydrolyzable groups bonded to the above metal or non-metal, depending on the valence of the metal. The number of hydrolyzable groups to be included in these compounds is not critical as long as the compound is soluble in the solvent. Likewise, selection of the exact hydrolyzable substituent is not critical since the substituents are either hydrolyzed or pyrolyzed out of the system. Typical hydrolyzable groups include, but are not limited to, alkoxy, such as methoxy, propoxy, butoxy and hexoxy, acyloxy, such as acetoxy, or other organic groups bonded to said metal or non-metal through an oxygen such as acetylacetonate. Specific compounds, therefore, include zirconium tetracetylacetonate, titanium dibutoxy diacetylacetonate, aluminum triacetylacetonate, tetraisobutoxy titanium, $B_3(OCH_3)_3O_3$ and $P_3(OCH_2CH_3)_3O$.

When hydrogen silsesquioxane resin is to be combined with one of the above ceramic oxide precursors, generally it is used in an amount such that the final ceramic coating contains 70 to 99.9 percent by weight $SiO_2$.

The hydrogen silsesquioxane resin coating material may also contain a platinum, rhodium or copper catalyst to increase the rate and extent of conversion to silica. Generally, any platinum, rhodium or copper compound or complex which can be solubilized will be functional. For instance, a composition such as platinum acetylacetonate, rhodium catalyst $RhCl_3[S(CH_2CH_2CH_2CH_3)_2]_3$, obtained from Dow Corning Corporation, Midland, Mich., or cupric naphthenate are all within the scope of this invention. These catalysts are generally added in an amount of between about 5 to 1000 ppm platinum, rhodium or copper based on the weight of hydrogen silsesquioxane resin.

The solvents used in the present invention are a mixture of saturated alkyl hydrocarbons. Specifically, the solvents comprise a mixture of octane, iso-octane and decane. Each of these solvents should be pure (eg., >99%) and should have very low water content (eg., <0.1%) to inhibit reactions with the H-resin.

Octane, $CH_3(CH_2)_6CH_3$, is well known in the art and is available commercially from a variety of sources. Generally, octane is obtained by refining petroleum products.

The inventors herein discovered that when octane is used to dissolve the H-resin, high quality coatings generally result. Specifically, the coatings generally are featureless and have a uniform color. These coatings are generally less than 610 nm thick using a 24 wt % solution and 2000 rpm spin speed.

Iso-octane, (2,2,4-trimethylpentane) $(CH_3)_3CCH_2CH(CH_3)_2$, is also well known in the art and available commercially from a variety of sources. Generally, iso-octane is also obtained by refining petroleum products.

The inventors herein discovered that when iso-octane is used to dissolve the H-resin, lower quality coatings generally result. Specifically, the coatings generally have blotches and striae. Striae are radial streaks of a color different from the film. Blotches are areas of color different from the film. These striae and blotches generally reflect thickness variations in the films. The coatings, however, are often thicker (eg., >630 nm using a 24 wt % solution and 2000 rpm spin speed) than those derived from octane.

Decane, $CH_3(CH_2)_8CH_3$, is also well known in the art and available commercially from a variety of sources. Generally, decane is also obtained by refining petroleum products.

The inventors herein discovered that when decane is used to dissolve the H-resin, moderate quality coatings (some blotches and striae) which are quite thin (eg., about 350 nm using a 24 wt % solution and 2000 rpm spin speed) often result.

Accordingly, the inventors herein unexpectedly discovered that by mixing these solvents they could obtain thicker, high quality coatings. Moreover, they discovered that mixtures could provide coatings which were thicker than with any individual solvent by itself.

Specifically, the present invention uses up to about 25 weight percent decane, between about 10 and about 35 weight percent iso-octane and between about 65 and about 90 weight percent octane to form a high quality, thick coating. These coatings have few, if any, blotches and striae and have thicknesses in excess of about 610 nm using a 24 wt % solution of H-resin and a 2000 rpm spin speed.

In a preferred embodiment of the invention, between about 15 and about 30 weight percent H-resin is diluted in a solvent containing between about 10 and about 25 weight percent iso-octane, between about 65 and about 85 weight percent octane and up to about 25 weight percent decane. In a more preferred embodiment of the invention, between about 15 and about 30 weight percent H-resin is diluted in a solvent containing about 20 weight percent iso-octane and about 80 weight percent octane. In yet another more preferred embodiment, between about 15 and about 30 weight percent H-resin is diluted in a solvent containing about 15 weight percent iso-octane, about 15 weight percent decane and about 70 weight percent octane.

In an alternative embodiment of the invention, the inventors herein use between about 60 and about 80 weight percent iso-octane, up to about 40 weight percent octane and up to about 40 weight percent decane to form coatings with thicknesses in excess of about 800 nm using a 24 wt % solution of H-resin and a 2000 rpm spin speed.

Preferably, the inventors herein use between about 65 and about 75 weight percent iso-octane, between about 10 and about 30 weight percent decane and up to about 25 weight percent octane to form coatings with thicknesses in excess of about 850 nm using a 24 wt % solution of H-resin and a 2000 rpm spin speed.

The compositions of the present invention can generally also contain minor amounts (eg., less than 5 wt %) of other solvents or additives without affecting the invention.

The above formulations consistently provide high quality and/or thick coatings as shown in the following Examples. As noted earlier, this high quality results from the nearly uniform, featureless surface. Such coatings are very advantageous in the electronics industry. Similarly, the thick coatings of the invention are desirable in the electronics industry because of the spatial separation they can provide.

It should be recognized that thickness variations in the coatings are also affected by factors other than the solvents used to dissolve the resin. Such factors include as spin speed and H-resin concentration. These factors should be taken into account when producing coatings with these compositions.

The following non-limiting examples are included so that one skilled in the art may more readily understand the invention.

EXAMPLE 1-Stability Testing

The following test was performed to compare the stability of H-resin in octane, iso-octane and decane to other solvents for this material reported in the literature. H-resin (made by the method of Collins et al. in U.S. Pat. No. 3,615,272) was diluted to 50 wt % in the solvents listed in Table 1 and stored at room temperature in one ounce glass vials. The solutions were then visually observed until they gelled. The results are presented in Table 1.

TABLE 1

| Solvent | Days to Gel |
| --- | --- |
| Methyl Isobutylketone | 2 |
| Octane | 20 |
| Heptane | 37 |
| Iso-octane | 41 |
| Decane | 53 |
| Dodecane | 57 |
| Octamethyl Cyclotetrasiloxane | 160+ |

As is apparent, the saturated alkyl hydrocarbons taught herein have stabilities similar to those of the other solvents.

EXAMPLE 2-Designed Experiment

Seventeen formulations of H-resin dissolved in octane, iso-octane and/or decane were prepared for a designed experiment (see Table 2). These formulations were prepared by combining 60 g H-resin (made by the method of Collins et al. in U.S. Pat. No. 3,615,272) and 180 g solvent and then shaking by hand to achieve slightly hazy solutions. These Solutions were then continuously filtered through a 0.1 micrometer capsule filter for 90 minutes. The filtered solutions were pumped into polyperfluoroethylene bottles. The filtering and bottling was performed in a Class 100 clean room. The non-volatile content of each formulation was obtained by weighing approximately 3 g of solution into 3 aluminum cups and heating the samples at 150° C. for 1 hour.

Six, 4 inch diameter silicon wafers were coated with each solution by spinning at 2000 RPM on a Semix Spin Coater. The coated wafer was then heated to allow the resin to melt and flow. This heating was conducted at 150° C. for 1 minute, 200° C. for 1 minute and 350° C. for 1 minute under an inert atmosphere. The coating was then converted to a ceramic by ramping the temperature up between 40° and 400° C. over 1 hour, holding the temperature at 400° C. for 1 hour and ramping the temperature down from 400° to 40° C. over 1 hour under an inert atmosphere.

A Tyger Thin Film Analyzer was used to determine the thickness of the coatings as spun, after flowing and after conversion. The coating thicknesses were measured at the same 9 points on each wafer. The average converted thickness, percent film deviation from average thickness on a wafer and percent deviation from the average of the six films cast for each formulation were recorded as responses.

The visual quality, based upon the number and size of striae and blotches present, was reduced to a numerical value and recorded as a response. Each wafer was given a value between 1 and 5, with 5 given to a visually perfect coating, depending on the amount of color variation present. The value which was recorded is the average of the six values assigned to the six wafers prepared for each formulation. A value of 5 means that all six coatings appeared featureless.

The average deviation on a wafer and between wafers and average thickness were obtained from the Tyger measurements following conversion of the coatings. The average deviation on a wafer is the average of the six deviation values (sigmas), obtained directly from the Tyger thickness measurements, divided by the average film thickness. This number represents the average variability of coating thickness on the individual wafers. The average deviation between the wafers is the sigma value for the average thickness value, which is the average of the coating thicknesses of the six wafers prepared with each formulation, divided by the average film thickness. It represents the degree of variability of film thickness between wafers.

The results of this experiment are provided in Table 2. The designed experiment also predicted FIG. 1.

TABLE 2

| | Weight Percent | | | | Average | Avg Dev On Wafer | | Avg Dev Waf/Waf | | Avg Surface |
| --- | --- | --- | --- | --- | --- | --- | --- | --- | --- | --- |
| No. | Decane | Octane | Iso-oct | % NVC | Thickness | % | nm | % | nm | Quality |
| 1 | 100.0 | 0.0 | 0.0 | 24.26 | 349.6 | 0.50 | 1.8 | 0.61 | 2.1 | 4.67 |
| 2 | 100.0 | 0.0 | 0.0 | 24.26 | 345.7 | 0.59 | 2.0 | 1.32 | 4.6 | 4.50 |
| 3 | 66.7 | 33.3 | 0.0 | 24.57 | 444.7 | 0.52 | 2.3 | 0.40 | 1.8 | 5.00 |
| 4 | 66.7 | 0.0 | 33.3 | 24.64 | 536.7 | 0.42 | 2.3 | 0.64 | 3.4 | 4.50 |
| 5 | 33.3 | 66.7 | 0.0 | 24.34 | 558.8 | 0.29 | 1.6 | 0.32 | 1.8 | 4.58 |
| 6 | 33.3 | 33.3 | 33.3 | 24.23 | 683.8 | 0.41 | 2.8 | 0.18 | 1.2 | 4.17 |
| 7 | 33.3 | 0.0 | 66.7 | 24.82 | 854.6 | 0.63 | 5.4 | 0.59 | 5.0 | 3.67 |
| 8 | 33.3 | 0.0 | 66.7 | 24.82 | 846.2 | 0.31 | 2.6 | 0.14 | 1.2 | 3.83 |
| 9 | 0.0 | 100.0 | 0.0 | 24.22 | 608.4 | 0.64 | 3.9 | 0.49 | 3.0 | 4.92 |
| 10 | 0.0 | 100.0 | 0.0 | 24.22 | 610.0 | 0.49 | 3.0 | 0.57 | 3.5 | 4.50 |
| 11 | 0.0 | 66.7 | 33.3 | 24.57 | 713.5 | 0.54 | 3.9 | 0.57 | 4.1 | 3.58 |
| 12 | 0.0 | 33.3 | 66.7 | 24.68 | 831.3 | 0.72 | 6.0 | 0.33 | 2.7 | 4.00 |
| 13 | 0.0 | 0.0 | 100.0 | 24.83 | 628.9 | 0.30 | 1.9 | 0.18 | 1.1 | 3.00 |
| 14 | 0.0 | 0.0 | 100.0 | 24.83 | 629.7 | 0.33 | 2.1 | 0.28 | 1.8 | 3.42 |
| 15 | 66.7 | 16.7 | 16.7 | 24.46 | 494.7 | 0.38 | 1.9 | 0.26 | 1.3 | 5.00 |
| 16 | 16.7 | 66.7 | 16.7 | 24.53 | 641.6 | 0.63 | 4.0 | 0.59 | 3.8 | 4.58 |
| 17 | 16.7 | 16.7 | 66.7 | 24.61 | 850.9 | 0.88 | 7.4 | 0.39 | 3.3 | 3.83 |
| Control | | | | 22.00 | 621.8 | 0.28 | 1.7 | 0.22 | 1.4 | 5.00 |

EXAMPLE 3

Formulations of H-resin dissolved in octane, iso-octane and/or decane were prepared in the same manner as Example 2 (see Table 3) except that the coating composition contained about 22 wt % H-resin dissolved in the solvent. These formulations were spun onto silicon wafers at 3000 rpm. The coated wafers were then processed and evaluated in the same manner as Example 2. The results of this Experiment are provide in Table 3.

TABLE 3

| No. | Weight Percent | | | % NVC | Average Thickness nm | Avg Dev On Wafer | | Avg Dev Waf/Waf | | Avg Surface Quality |
|---|---|---|---|---|---|---|---|---|---|---|
| | Decane | Octane | Iso-oct | | | % | nm | % | nm | |
| 1 | 32.6 | 35.0 | 32.4 | 22.33 | 487.7 | 0.40 | 2.0 | 0.49 | 2.4 | Fine Spray |
| 2 | 12.5 | 23.4 | 64.1 | 22.3 | 611.0 | 0.72 | 4.3 | 0.49 | 3.0 | Striations |
| 3 | 33.3 | 33.3 | 33.4 | 22.36 | 488.1 | 0.34 | 1.7 | 0.34 | 1.6 | Fine Spray |
| 4 | 34.4 | 27.0 | 38.6 | 21.93 | 453.5 | 0.57 | 2.6 | 0.22 | 1.0 | Good Film |
| 5 | 31.8 | 28.2 | 40.0 | 22.21 | 496.4 | 0.55 | 2.7 | 0.44 | 2.2 | Spray |
| 6 | 36.0 | 22.0 | 42.0 | 22.03 | 488.4 | 0.44 | 2.2 | 0.34 | 1.7 | Fine Spray |
| 7 | 38.0 | 20.0 | 42.0 | 21.92 | 485.1 | 0.44 | 2.1 | 0.27 | 1.3 | Fine Spray |
| 8 | 40.0 | 18.0 | 42.0 | 21.95 | 480.0 | 0.36 | 1.7 | 0.30 | 1.4 | Very Fine Spray |
| 9 | 0.0 | 100.0 | 0.0 | 21.71 | 413.1 | 0.21 | 0.9 | 0.45 | 1.9 | Good Film |
| 10 | 0.0 | 80.0 | 20.0 | 21.20 | 431.4 | 0.61 | 2.6 | 0.19 | 0.8 | Good Film |
| 11 | 33.3 | 66.7 | 0.0 | 20.76 | 353.3 | 0.55 | 1.9 | 0.71 | 2.5 | Good Film |
| 12 | 15.0 | 70.0 | 15.0 | 21.15 | 412.0 | 0.58 | 2.4 | 0.66 | 2.7 | Good Film |
| 13 | 34.4 | 27.0 | 38.6 | 22.80 | 480.3 | 0.40 | 1.9 | 0.15 | 0.7 | Very Fine Spray |

("Spray" is similar to striae except the streaks are merely a different shade of the film color as opposed to the entirely different color seen with striae)

That which is claimed is:

1. A coating composition comprising:

between about 10 and about 40 weight percent hydrogen silsesquioxane resin diluted in a solvent comprising up to about 25 weight percent decane, between about 10 and about 35 weight percent iso-octane and between about 65 and about 90 weight percent octane.

2. The coating composition of claim 1 wherein the hydrogen silsesquioxane resin contains polymeric species such that at least 75% of the polymeric species have a molecular weight between about 1200 and about 100,000.

3. The coating composition of claim 1 also containing a platinum, rhodium or copper catalyst in an amount of between about 5 and about 1000 ppm platinum, rhodium or copper based on the weight of hydrogen silsesquioxane resin.

4. The coating composition of claim 1 wherein the hydrogen silsesquioxane resin is present in an amount between about 15 and about 30 weight percent.

5. The coating composition of claim 1 wherein the solvent contains between about 10 and about 25 weight percent iso-octane, between about 65 and about 85 weight percent octane and up to about 25 weight percent decane.

6. A coating composition comprising:

between about 10 and about 40 weight percent hydrogen silsesquioxane resin diluted in a solvent comprising between about 60 and about 80 weight percent iso-octane, up to about 40 weight percent octane and up to about 40 weight percent decane.

7. The coating composition of claim 6 wherein the hydrogen silsesquioxane resin contains polymeric species such that at least 75% of the polymeric species have a molecular weight between about 1200 and about 100,000.

8. The coating composition of claim 6 also containing a platinum, rhodium or copper catalyst in an amount of between about 5 and about 1000 ppm platinum, rhodium or copper based on the weight of hydrogen silsesquioxane resin.

9. The coating composition of claim 6 wherein the hydrogen silsesquioxane resin is present in an amount between about 15 and about 30 weight percent.

10. The coating composition of claim 6 wherein the solvent contains between about 65 and about 75 weight percent iso-octane, between about 10 and about 30 weight percent decane and up to about 25 weight percent octane.

* * * * *